Dec. 23, 1969    C. T. ROTH    3,485,546
FIELD FLATTENER SCANNING MEANS
Filed Feb. 2, 1967    2 Sheets-Sheet 1

INVENTOR.
CHARLES T. ROTH
BY
ATTORNEYS

United States Patent Office 3,485,546
Patented Dec. 23, 1969

3,485,546
FIELD FLATTENER SCANNING MEANS
Charles T. Roth, Webster, N.Y., assignor to Xerox Corporation, Rochester, N.Y., a corporation of New York
Filed Feb. 2, 1967, Ser. No. 613,676
Int. Cl. G02b 17/00; G02f 1/34
U.S. Cl. 350—7
3 Claims

ABSTRACT OF THE DISCLOSURE

Optical scanning apparatus wherein light is directed onto the apex of a rotating pyramidal polygon mirror to divide the light into a plurality of light beams directed at 360 degrees and including a lens stop positioned to blank out the reflecting surface near the apex of the pyramidal mirror.

BACKGROUND

This invention relates to optical scanning systems and specifically to apparatus for improving the focus of a scanning beam in a system of the type wherein light is directed coaxially onto a rotating, pyramidal polygon mirror to form a plurality of scanning beams.

Rotating reflective prisms are commonly used in optical scanning systems to provide means for a spot of light to repeatedly sweep a target surface. In such systems the blank time or nonscanning time is limited by the time lost when the light spot intersects the edges or corners of the prism. In systems requiring high sweep rates it is desirable to have scanning apparatus which provide a substantially zero blank time. The scanning system in copending application Ser. No. 488,469, now abandoned, is such a system and is capable of being adapted to obtain a substantially zero blank time by using a plurality of scanning spots simultaneously formed by directing light coaxially onto the apex of a rotating pyramidal polygon mirror. This type of system does not have a single scanning spot moving from one face of the prism to the next and thus eliminates the blank time which usually occurs during the transition of the scanning spot between prism faces. The amount of light required to form the plurality of scanning spots is greater but the scanning speeds obtained are also greater. The optical scanning systems of the type disclosed in the copending application shall hereinafter be referred to as pyramidal scanning systems.

Any scanning system which utilizes a fixed light source and a rotating reflective surface to scan flat target surfaces encounters the problem of a changing relation between object and image distances and thus a variation in size of the scanning spot on the target surface. The solution to this problem is commonly referred to as field flattening. In systems utilizing rotating reflective surfaces the focal point of the scanning beam follows a curved path; therefore the scanning spot varies in size whenever the surface being scanned does not conform to the curved path followed by the focal point of the scanning beam. The out of focus or spot size growth that occurs can be corrected by inserting appropriate lens or mirrors in the path of the scanning beam to continuously correct the change in the relation between the object and image distances but this adds to the complexity of a system and limits its flexibility.

The amount of spot size growth can be controlled to within desired limits by narrowing the distance between the extreme rays of the scanning beam and thus reduce the amount the scanning spot is out of focus or the amount of its growth for each unit of change in the distance between the curved path followed by the focal point of the beam and the surface to be scanned. In conventional systems using a rotating reflective prism or the like the scanning beam is narrowed by decreasing the aperture of the focusing lens. This method can also be used in pyramidal scanning system. However, for a beam of predetermined intensity, optimum field flattening is not obtained by using the conventional technique of reducing the aperture of the focusing lens to limit the transmission of light to a smaller circular area near the center of the lens.

The cross-section of the scanning beam in a pyramidal scanning system is triangular because the scanning beams are shaped by the triangular faces on the pyramidal mirror. The most efficient cross-section for a scanning beam for purposes of controlling spot growth is a circle since for a given area, the factor determining spot intensity, the diameter of a circle is smaller than the major dimension of any other geometric shape enclosing the same area. When the aperture of the lens used in a pyramidal scanning system is reduced in the conventional manner the scanning beams are narrowed since the lens stop blanks out the areas near the bases of the trangular mirror faces. The narrowed scanning beams continue to have a substantially triangular cross-section. However, as mentioned above, the circle is the most efficient shape for the cross-section of a scanning beam for controlling spot size growth and hence the altered scanning beams although narrowed do not provide optimum control of spot growth.

The present invention provides pyramidal scanning systems with means to improve control over spot size growth during the scan of flat surfaces. The improved control over spot growth is obtained by shaping the cross-section of a scanning beam in a more efficient configuration than the triangular shape given the beam by the faces of the pyramidal mirror. Areas on the pyramidal mirror faces which more closely approximate the shape of a circle are selected as the areas to be used to form the scanning beams. As mentioned above, a circle is the most efficient cross-sectional shape for a beam of given intensity to have for controlling spot size growth because the diameter of the circle is smaller than the major dimension of any other geometric figure enclosing the same area. A geometric figure with the greatest number of sides is the next most efficient shape to use since it most nearly approximates a circle. It necessarily follows that the least efficient figure is the triangle since it is the geometric figure with the least number of sides. The present invention substantially improves the control of spot size growth in a pyramidal scanning system by imparting a substantially trapezoidal shape to the cross-section of the scanning beam.

It is accordingly an object of the present invention to

It is another object of the invention to improve control over spot size growth of a beam of light formed on the face of a rotating, pyramidal polygon mirror as the beam scans a flat surface.

It is another object of the invention to provide simple apparatus for controlling the focus of a scanning spot used in a pyramidal scanning system which scans a surface of non-curved cross section.

improve the operation of pyramidal scanning systems by limiting, to within desired limits, the spot size growth occurring in the scanning beam of the system while scanning flat surfaces.

It is another object of the invention to provide in an optical scanning system wherein light is directed coaxially onto the apex of a pyramidal polygon mirror a light beam formed on a face of the pyramidal mirror having a narrower distance between its extreme rays than a beam of like intensity formed on a triangular area of a mirror face.

SUMMARY OF THE INVENTION

The above and other objects of the invention are attained by inserting a lens stop in the optical path of the focusing lens of a pyramidal scanning system to blank out the central area of the lens and thereby restrict the formation of scanning beams on the pyramidal mirror to the substantially trapezoidal areas near the base of the triangular faces of the pyramidal mirror.

DESCRIPTION OF THE DRAWINGS

Further objects and features of the invention will become apparent by reading the description in connection with the drawings wherein.

DESCRIPTION OF THE PREFERRED EMBODIMENT

Figure 1:
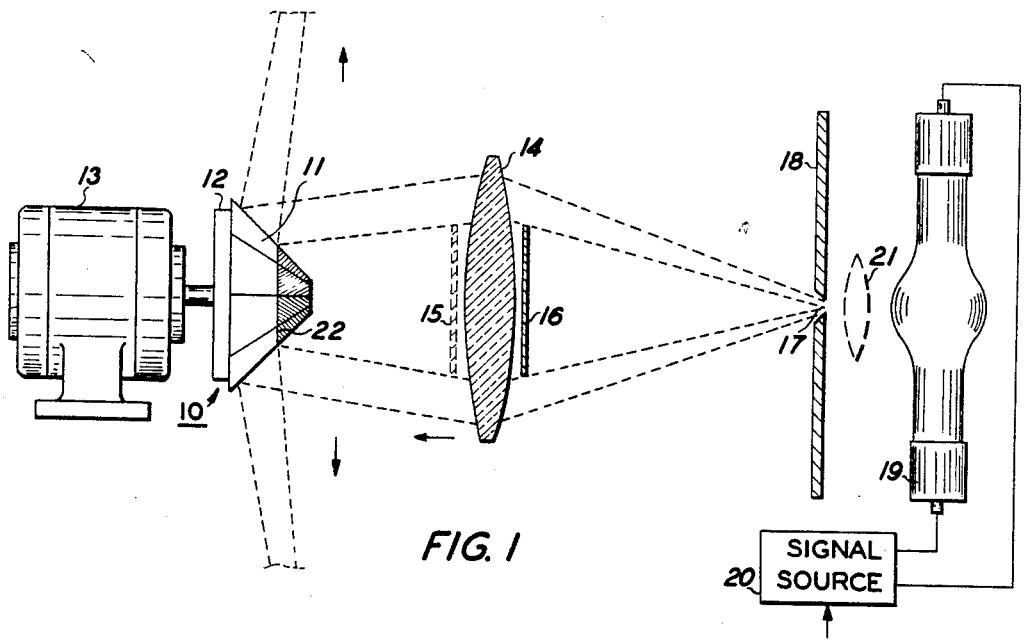
FIGURE 1 is a side view of the optical arrangement of the pyramidal scanning system to which the present invention is an improvement.
Figure 2:
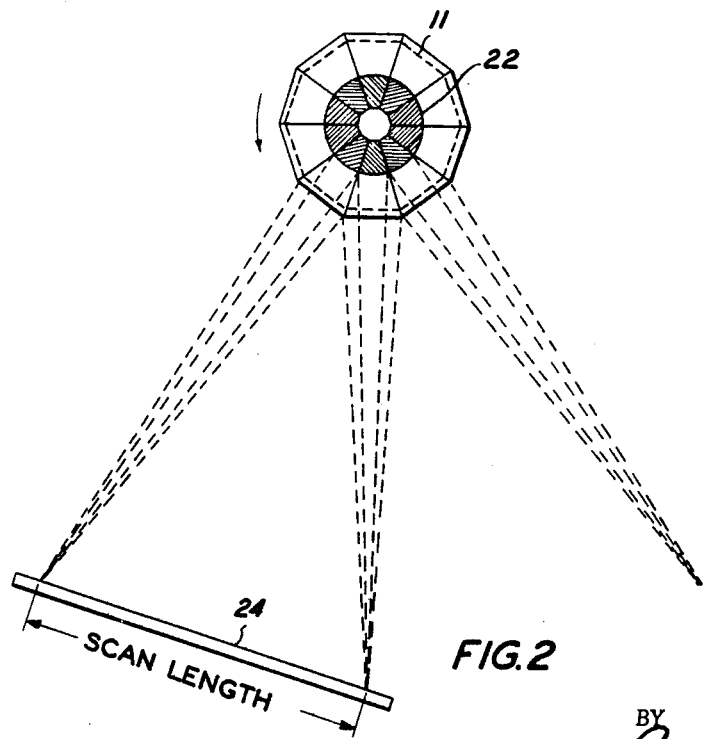
FIGURE 2 is a top view of the rotating pyramidal mirror of the pyramidal scanning system.

Referring now to FIGS. 1 and 2, there is shown the scannning system of the type set out in copending application Ser. No. 488,469, filed Sept. 20, 1965, now abandoned. The scanning unit 10 comprises a multisided pyramidal or truncated polygonal mirror 11 secured on a turntable 12 and continuously rotated by means of motor 13. The polygon is arranged coaxially, symmetrical about an objective lens 14 with each of the faces thereof extending from the apex about 45 degrees relative to the axis of rotation. Light of high intensity impinging on the polygon faces is emitted, for example, from a high intensity arc lamp 19 that is modulated in accordance with received intelligence information by a signal source 20. The arc of the lamp is imaged onto a spot aperture 17 formed in a shield plate 18 and then into a lens 14. Imaging the arc onto the aperture can be accomplished by either placing the lamp at the focus of the lens or by employing an auxiliary relay lens 21 (shown dashed).

The conical light beam emerging from the lens is projected onto the on-axis multisided rotating mirror which divides the beam into as many parts as there are sides to the mirror. Since the scanner is mounted coaxially with the lens, each part of the light beam is focused to a spot the same radial distance from the lens axis while the light spot remains the same intensity and size as it advances in a circular motion by virtue of the polygon rotation. The received light at the polygon is reflected off each of the faces, as shown by the arrows, to an imaging plane at which is supported the appropriate sensing elements, e.g., a xerographic plate 24 for utilizing the reflected light signal. At this point it should be understood that the light source can be replaced by a photosensor and the direction of the light path can be reversed. This reversible operation of the scanning system is explained fully in the above mentioned copending application. The present invention would be equally applicable in the reverse operation of the system.

Typically the polygonal mirror 11 can be about 0.5 to 5 inches in diameter with 2 to 20 number of facets in accordance with the application and rotated in accordance with requirements from about 12 to 12,000 r.p.m. without encountering difficulties of manufacture or loss of reflected resolution. Motor 13 can be either AC or DC, with the latter being preferred for applications encountering fluctuating line voltages likely to affect a constant speed to be maintained. The motor 13 may be directly or indirectly connected operably to the turntable 12.

Figure 3:
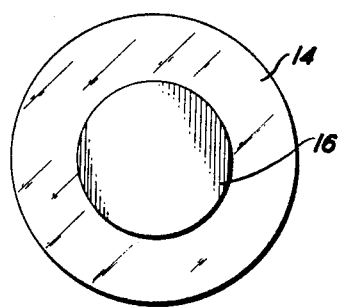
FIGURE 3 is a front view of the lens stop shown in FIGURE 1.
Figure 4:
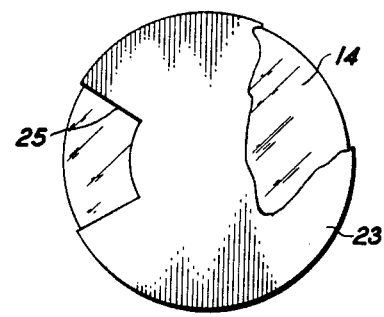
FIGURE 4 is an example of one of many shapes a lens stop of the present invention may take.

The lens stop 16, shown in FIG. 1, used to shield the central areas of the lens 14 from light rays emitted by the light source 19 and may be positioned on either side of the lens 14 but preferably should be relatively close to lens 14 as is evident to those skilled in the art. Lens stop 15, (shown dashed) in FIG. 1, illustrates an alternate position for placing the lens stop. The lens stop 16 may be made of any suitable opaque material and can be mounted adjacent to the lens in any suitable manner including being mounted adhesively directly on a face of the lens. The lens stops 16 shown in FIG. 1 and FIG. 3 are circular but many other shapes could be used depending on the requirements of a particular scanning system. FIG. 4 illustrates a configuration that would produce the same results as a circular lens stop. The lens stop 23 shown in FIG. 4 is an alternative shape for the lens stop of the present invention. Lens stop 23 when positioned in relation to the lens 14 as illustrated would still shield the central areas of the lens from the light source but would also shield all other areas of the lens except the area of aperture 25 that would transmit light to a limited number of faces on the pyramidal mirror. Lens stop 23 can be used in a system where only a limited number of the plurality of scanning beams formed by the pyramidal mirror are needed to transmit intelligence information. For example, if a single surface such as surface 24 in FIG. 2 is to be scanned there is no need for the faces of the mirror to reflect light while they are not in a position to direct a beam onto the surface to be scanned.

With lens stop 16 inserted in the system as shown in FIG. 1 the operation of the system is unchanged except that thet amount of light transmitted through the system is reduced. Light emitted through aperture 17 passes through lens 14 at the areas of lens 14 not shielded by lens stop 16. The light transmitted by the lens 14 strikes the reflecting mirror 11 at areas below line 22. Light is reflected on all the faces of the mirror in beams distributed at 360 degrees about the mirror. The narrowed beams are used to scan a target surface 24 the same as in the operation of the system without the lens stop 16 in position.

Figure 5:
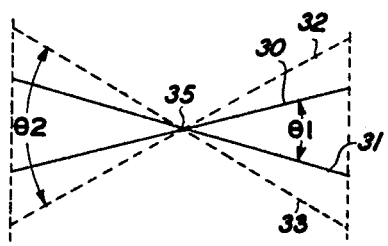
FIGURE 5 is an enlarged side view of the intersection of the extreme rays of a scanning beam.

The present invention improves the operation of pyramidal scanning systems by increasing control over spot size growth during the scan of flat surfaces. The increase in control of spot growth is attained by narrowing the distance between the extreme rays of a scanning beam of given intensity. In FIG. 5 there is shown the intersection of the extreme rays of two scanning beams. The intersection of the rays or focal point 35 represents the image projected by the focusing lens 14 (FIG. 2). The image is assumed to be a point although in reality it will have a finite size dependent upon the size of aperture 17 (FIG. 1). The assumption is valid for the following discussion since a scanning spot or image will normally have a magnitude in the order of .005 inch and for images of this magnitude the critical factor in controlling spot growth is the distance between extreme rays of the beam emittted by a point source and not the major dimension of the image. The closer the extreme rays 30 and 31 of a scanning beam are to each other or the smaller the angle $\theta$ becomes the smaller the scanning spot will be when the beam is projected on a target surface which is not positioned at the focal point of the beam. This is clearly illustrated by referring to FIG. 5. For any given distance from focal point 35 the size of the spot formed by the beam of angle $\theta 1$ will be smaller than the spot formed by the beam of angle $\theta 2$ since the extreme rays 32 and 33 of the beam of angle $\theta 2$ are separated by a greater distance than the extreme rays 30 and 31 of the beam of angle $\theta1$. The procedure of narrowing the angle between the extreme rays of a scanning beam to control spot size growth is commonly referred to as field flattening.

One conventional technique employed for reducing the angle between the extreme rays of a scanning beam is to reduce the area of the aperture of the focusing lens. This technique can be applied to pyramidal scanning systems and to some extent produces the desired result. The present invention while retaining the goal of seeking the narrowest scanning beam goes beyond the conventional technique and attains substantial improvement in control of spot size growth by using simple apparatus applied in an unobvious manner.

The following discussion is directed toward a pyramidal mirror and not to a truncated mirror as shown in FIG. 1 since what will be true in the case of the complete pyramid will be true for the truncated mirror as will be evident from the following discussion.

Figure 6:
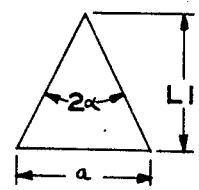
FIGURE 6 is an illustration of the area on a single face of the pyramidal mirror reflecting light when a conventional lens stop is used in the pyramidal scanning system.

Referring now to FIG. 6 there is shown a top view of single triangular face of the pyramidal mirror. Design requirements of a particular system require the scanning spot to have a specific intensity. The intensity of the spot, for a given light source, is determined by the area of the lens available to transmit light, or referring to the mirror, the area of the individual face of the mirror which shapes the cross section of the scanning beam. The area of the triangle in FIG. 6, $\frac{1}{2}a \times L1$, therefore represents the minimum reflective area required to obtain a scanning spot of the desired intensity. If this area is less than that of the individual faces of a specific pyramidal mirror the beam can be narrowed to equal the minimum area by the conventional application of a lens stop whereby the area below the base of the triangle of FIG. 6 is prevented from reflecting light. Here it is pointed out that in such a case the line "$a$" in FIG. 6 would be curved and not straight. The line "$a$" is assumed to be straight to simplify the discussion. In systems having a pyramidal mirror with a large number of faces (about 10) the angle $\alpha$ would be small so the error in the following calculation would be small. At any rate, a lens stop having the same number of sides as the mirror and rotated at the same speed as the mirror could be used to give the exact results indicated.

Figure 7:
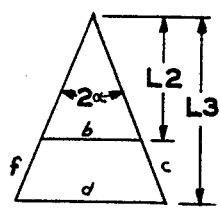
FIGURE 7 is an illustration of the area on a single face of the pyramidal mirror reflecting light when the lens stop of the present invention is used.

Referring now to FIG. 7 there is shown a top view of a complete face of the pyramidal mirror. The altitude $L3$ of the triangular face is determined by many factors in the design of the pyramidal scanning system, e.g., it would effect the mass of the mirror and hence the range of rotational speeds over which stability could be obtained. The altitude $L3$ is of course assumed to be larger than the altitude $L1$ of the triangle in FIG. 6 since the area of that triangle is the minimum area needed for a given spot intensity. The goal of the present discussion is to show that there is an area on the face of the mirror which is equal in area to that of the triangle of FIG. 6 but which has a major dimension less than the altitude $L1$, the major dimension of the triangle in FIG. 6. The desired area is that bounded by lines $bcdf$ as shown in FIG. 7, i.e., the area of $bcdf$ is set equal to $\frac{1}{2}a \times L1$. Also, the length $L3-L2$ is set equal to $\frac{1}{2}(b+d)$. This latter requirement placed on area $bcdf$ is to insure that its major extremity will be substantially equal to $L3-L2$. The next step is to prove that $L3-L2$ is less than $L1$ since it would then be established that an area on the mirror face has been found which is equal to the minimum area required for a given spot intensity but has a major dimension less than that of the triangle in FIG. 6.

The equation:

(1) $\quad \frac{1}{2}aL1 = \frac{1}{2}dL3 - \frac{1}{2}bL2$ is derived from the condition that the area $bcdf$ must be equal to $\frac{1}{2}aL1$.

The following equations are established by applying trigonometry to the triangles in FIGS. 6 and 7.

(2) $\quad \frac{1}{2}a = L1 \tan \alpha$ (3) $\quad \frac{1}{2}b = L2 \tan \alpha$ (4) $\quad \frac{1}{2}d = L3 \tan \alpha$ Substituting Equations 2, 3, and 4 into Equation 1 yields:

(5) $\quad L1^2 = L3^2 - L2^2$

Substituting the values for $b$ and $d$ derived from Equations 3 and 4 into the Equation $L3-L2 = \frac{1}{2}(b+d)$ which expresses the condition placed on area $bcdf$ yields $$L3 - L2 = \frac{2L3 \tan \alpha + 2L2 \tan \alpha}{2}$$

or (6) $\quad L3 + L2 = \dfrac{L3 - L2}{\tan \alpha}$

The Equation 5 may be factored to yield (7) $\quad L1^2 = (L3 + L2)(L3 - L2)$ and substituting Equation 6 into Equation 7 yields $$L1^2 = \frac{(L3 - L2)^2}{\tan \alpha}$$

or (8) $\quad L1 = \dfrac{L3 - L2}{\sqrt{\tan \alpha}}$

From Equation 8 it is seen that $L3 - L2 < L1$ when $\tan \alpha < 1$ which is the case when $\alpha$ is less than 45 degrees. Each mirror face has an angle of $2\alpha$ (see FIGURES 6 and 7) hence for $\alpha$ equal to 45 degrees the mirror has four faces. Therefore it is a limitation on the present apparatus when used for the purpose of controlling spot size growth that the pyramidal mirror have five or more faces. Experience has taught, however, that pyramidal scanning systems having 8 to 16 sides on the reflective mirror offer the most flexible system performance.

In a pyramidal scanning system having a ten sided mirror $\alpha$ is equal to 18 degrees. The tan 18 degrees equals .324 and the square root of 0.324 is approximately 0.57. The benefit received from the present invention is thereby readily apparent in view of the specific case cited since the scanning beam is narrowed almost by a factor of two without suffering a loss in spot intensity.

As pointed out earlier the pyramidal mirror was treated as though it was not truncated. In practice the mirror is slightly truncated for ease in the manufacture of the mirror. The same analysis as above can also be applied to show that the area near the base of a truncated mirror face is more efficient for the purpose of controlling spot size growth than the area near the apex of a truncated mirror face. The reason, of course, being due to the fact that the lower area on the mirror face more closely approximates the shape of a circle which, as pointed out earlier, is the most efficient shape for the cross-section of the scanning beam.

The objectives of the present invention can be obtained by truncating the mirror to the desired point on the mirror face or by painting the area of the mirror intended to be blacked out with a non-reflective substance. These techniques, however, would unduly restrict the scanning system. With the apparatus of the present invention the intensity of the scanning spot may be changed at will by merely substituting a lens stop having a different shape or by removing it from the system altogether. If a truncated or painted mirror were used, a new mirror would have to be substituted to obtain a spot having a different intensity.

Since many changes could be made in the above construction and many different embodiments of this invention could be made without departing from the scope thereof, it is intended that all matter contained in the drawings and specification shall be interperted as illustrative and not as a source of limitation.

What is claimed is:

1. A system for optically scanning a surface comprising:
   (a) a light generating source,
   (b) a lens supported in the optical path of said light source,
   (c) scanning means optically aligned with said source to receive and reflect the light focused thereon by said lens and comprising an at least a partially pyramidally formed multifaced mirror rotating continuously about a concentric axis extending from its base, the optical axis of said lens being coaxially aligned with the rotational axis of said scanning means, said lens directing the light emitted from said light source along a path parallel to the axis of rotation of said mirror, the resulting plurality of light beams formed on the faces of the mirror being used to scan said surface, and
   (d) a circular opaque member positioned adjacent said lens and coaxially aligned therewith to prevent the transmission of light through the lens to the mirror at the central areas of the lens and thereby limit the formation of the plurality of light beams to the areas of the mirror faces near the base of the mirror whereby increased control over spot size growth is obtained during the scan of said surface.

2. An opaque member according to claim 3 having a shape which prevents the transmission of light through the lens to the mirror at the central area of the lens and all remaining area of the lens except within an area which permits light to be directed by the lens onto a limited number of the pyramidal mirror faces.

3. A system for optically scanning a surface comprising:
   (a) a light generating source,
   (b) a lens supported in the optical path of said light source for focusing said generated light,
   (c) scanning means optically aligned with said source to receive and reflect the light focused thereon by said lens and comprising at least a partially pyramidally formed multi-faced mirror rotating continuously about a concentric axis extending from its base, the optical axis of said lens being coaxially aligned with the rotational axis of said scanning means, and
   (d) an opaque member positions between said mirror and light source and coaxially aligned with the rotational axis of said mirror to prevent the surfaces near the apex of said mirror from reflecting light whereby increased control over spot size growth is obtained as the narrowed beams formed by the remaining surfaces on the mirror scan a surface which is at varying distances from the path followed by the focal point of a beam as the mirror is rotated.

References Cited

UNITED STATES PATENTS

| | | | |
|---|---|---|---|
| 2,928,952 | 3/1960 | Bednarz | 350—7 |
| 2,185,221 | 1/1940 | Nakken | 350—205 X |
| 2,844,648 | 7/1958 | Rosenthal | 178—7.6 X |
| 3,064,077 | 11/1962 | Cary | 178—6.6 |
| 3,102,162 | 8/1963 | McNaney | 178—6.6 |
| 3,264,480 | 8/1966 | Zuck et al. | 350—7 |
| 3,316,348 | 4/1967 | Hufnagel | 178—7.6 |
| 3,234,843 | 2/1966 | Killpatrick | 350—7 |
| 3,360,659 | 12/1967 | Young. | |

FOREIGN PATENTS 415,908   10/1924   Germany.

DAVID SCHONBERG, Primary Examiner

P. R. GILLIAM, Assistant Examiner

U.S. Cl. X.R.

178—7.6; 350—285